United States Patent
Castrovinci

(10) Patent No.: US 8,368,518 B1
(45) Date of Patent: Feb. 5, 2013

(54) ACCESS-INTEGRATED RFID-BASED ASSET MANAGEMENT SYSTEM

(75) Inventor: Joseph Castrovinci, Bayonne, NJ (US)

(73) Assignee: National Metering Services, Inc., Kearny, NJ (US)

( * ) Notice: Subject to any disclaimer, the term of this patent is extended or adjusted under 35 U.S.C. 154(b) by 0 days.

(21) Appl. No.: 13/439,393

(22) Filed: Apr. 4, 2012

(51) Int. Cl.
*G08B 13/14* (2006.01)
(52) U.S. Cl. .................................... 340/10.51
(58) Field of Classification Search ............ 340/10.1, 340/10.3, 10.31, 10.4, 10.42, 10.5, 10.51, 340/572.1, 568.1, 540, 572.5, 572.7, 572.8; 137/820, 882, 559
See application file for complete search history.

(56) References Cited

U.S. PATENT DOCUMENTS

| | | | |
|---|---|---|---|
| 6,053,207 A * | 4/2000 | Benedetti | 137/820 |
| 6,388,575 B1 * | 5/2002 | Galloway | 340/572.1 |
| 6,968,969 B1 * | 11/2005 | McKinnon, Jr. | 220/484 |
| 7,002,461 B2 | 2/2006 | Duncan et al. | |
| 7,791,480 B2 | 9/2010 | Skorpik et al. | |
| 2008/0150701 A1 | 6/2008 | Randmae | |
| 2009/0009297 A1 | 1/2009 | Shinohara et al. | |
| 2009/0051502 A1 * | 2/2009 | Craik | 340/10.51 |
| 2009/0058610 A1 | 3/2009 | Krebs et al. | |
| 2012/0098641 A1 * | 4/2012 | Whittle | 340/10.1 |

\* cited by examiner

*Primary Examiner* — Nabil Syed
(74) *Attorney, Agent, or Firm* — Thomas J. Germinario

(57) ABSTRACT

An access-integrated RFID-based asset management (AIR-BAM) system is used to acquire and update field data on physical assets located beneath or behind RF-permeable access structures, such as underground valves located beneath plastic valve covers or boxes. Inspection/maintenance personnel using hand-held RFID readers acquire field data from RFID tags located in the access structures prior to physically accessing the assets and write updated field data to the RFID tags after completing the inspection and/or maintenance. Alternately, field data regarding the assets can be stored in a database residing on the mobile RFID readers and can be retrieved and updated based on alpha-numeric identifiers transmitted by the RFID tags.

3 Claims, 2 Drawing Sheets

ACCESS-INTEGRATED RFID-BASED ASSET MANAGEMENT SYSTEM

BACKGROUND OF THE INVENTION

The present invention relates to the general field of Radio Frequency Identification (RFID) transponder-reader systems, and more particularly to RFID-based management of physical assets that are located underground or within structures.

There are several technical problems associated with RFID-based management of physical assets which are located underground or within structures. An RFID transponder attached to the asset may be screened from the RFID reader/detector by intervening metallic covers, boxes, casings, etc., which shield and block RF transmissions. If the asset is deeply buried or embedded, the required read/write range may necessitate the use of more costly active and/or microwave RFID transponders. And if higher power RFID transponders are necessary, they can cause crossover interference among clustered assets.

The Access-Integrated RFID-Based Asset Management (AIRBAM) System addresses these problems by locating the RFID transponder in an RF-permeable means of access to the buried/embedded asset, rather than attached to the asset itself. This enables inspection/maintenance personnel to use a hand-held or portable RFID reader to retrieve information regarding the asset and its current status from the RFID transponder without opening the access structure.

Although the patent literature abounds with RFID-based asset management systems, none of these address the problems associated with remote and/or inaccessible assets.

While the US Patent of Duncan et al. (U.S. Pat. No. 7,002,461) discloses a RFID-based system for detecting hidden objects, such as manholes and anchor cables, it requires that the RFID transponders be attached directly to the objects. It does, however, make use of the optimal UHF frequency range of 902-928 MHz, which enables the use of low-power, relatively inexpensive tags with a range of several meters.

The US Patent Publication of Shinohara, et al. (2009/0009297) discloses a system for disclosing valve actuation information. Since the system requires that the RFID tag be affixed directly to the valve, it is not adaptable to remote or inaccessible installations. Moreover, the Shinohara system requires the use of active RFID tags, whereas an optimal system can employ either active or passive tags, depending on the range required.

The US Patent Publication of Krebs et al. (2009/0058610) describes a RFID-based system of valve detection. Although this document refers to the use of injection molding to embed the RFID transponder in plastic valve casings, the Krebs system cannot be modified to instead embed the transponder in the casing cover, since the system requires that the transponder be located adjacent to the reader within the valve casing.

The US Patent of Skorpik et al. (U.S. Pat. No. 7,791,480) teaches an RFID-based process control monitoring system, in which RFID sensor assemblies and cooperating RFID control tags are coupled or proximate to monitored components. While this system, like those previously discussed, is not useful in the context of remote and inaccessible components, it does employ the principle of a limited RFID read/write range in order to avoid crossover RF interference among clustered components, as does the present invention.

SUMMARY OF THE INVENTION

The AIRBAM system of the present invention uses one or more field-programmable RFID transponders in conjunction with one or more cooperating portable RFID readers, preferably hand-held. Instead of being placed on or near the managed asset, the RFID tags are installed on or inside an access structure, such as a cover, casing, box, vault, door or panel, leading to the asset. The tags need not be in close proximity to the asset, because they are not used to monitor the operation of the asset. Instead, they are used to provide basic information about the asset to field personnel involved with inspecting, adjusting or maintaining the asset.

The present invention is specifically designed to manage assets which are difficult to access directly, particularly underground equipment. By locating on the access structure rather than the asset itself, the AIRBAM system reduces the distance over which the RFID transponder must communicate with the reader. This enables the use of low power, medium range passive RFID tags, which are less expensive than higher power active tags. For example, passive RFID tags operating in the 902-928 MHz UHF band have a range of 2 meters with moderate-to-high data speed at a cost of less than $0.25 per tag. Aside from cost, another advantage of low-power passive RFID tags is avoidance of crossover interference among multiple tags assigned to clustered assets.

As applied to a buried well pump, for instance, the RFID transponder could be attached to the well cover and could record the type and rating of the pump, its GPS coordinates, date put in service, past maintenance/inspection dates, including maintenance performed and by whom, and next scheduled maintenance/inspection dates including upcoming scheduled maintenance work. Since the RFID tag is field-programmable, the inspection and maintenance information can be updated after each visit.

In applications where the requisite data regarding the asset exceeds the data capacity of the RFID tag, or where the cost of using higher capacity active tags is prohibitive, some or all of the asset data can be stored in a searchable database residing on the mobile RFID reader. In such cases, the RFID reader would receive an alpha-numeric identifier from the tag associated with the asset, and the data associated with that identifier would be retrieved from the resident database of the reader.

The foregoing summarizes the general design features of the present invention. In the following sections, a specific embodiment of the present invention will be described in some detail. This specific embodiment is intended to demonstrate the feasibility of implementing the present invention in accordance with the general design features discussed above. Therefore, the detailed description of this embodiment is offered for illustrative and exemplary purposes only, and it is not intended to limit the scope either of the foregoing summary description or of the claims which follow.

DETAILED DESCRIPTION OF THE PREFERRED EMBODIMENT

Figure 1:
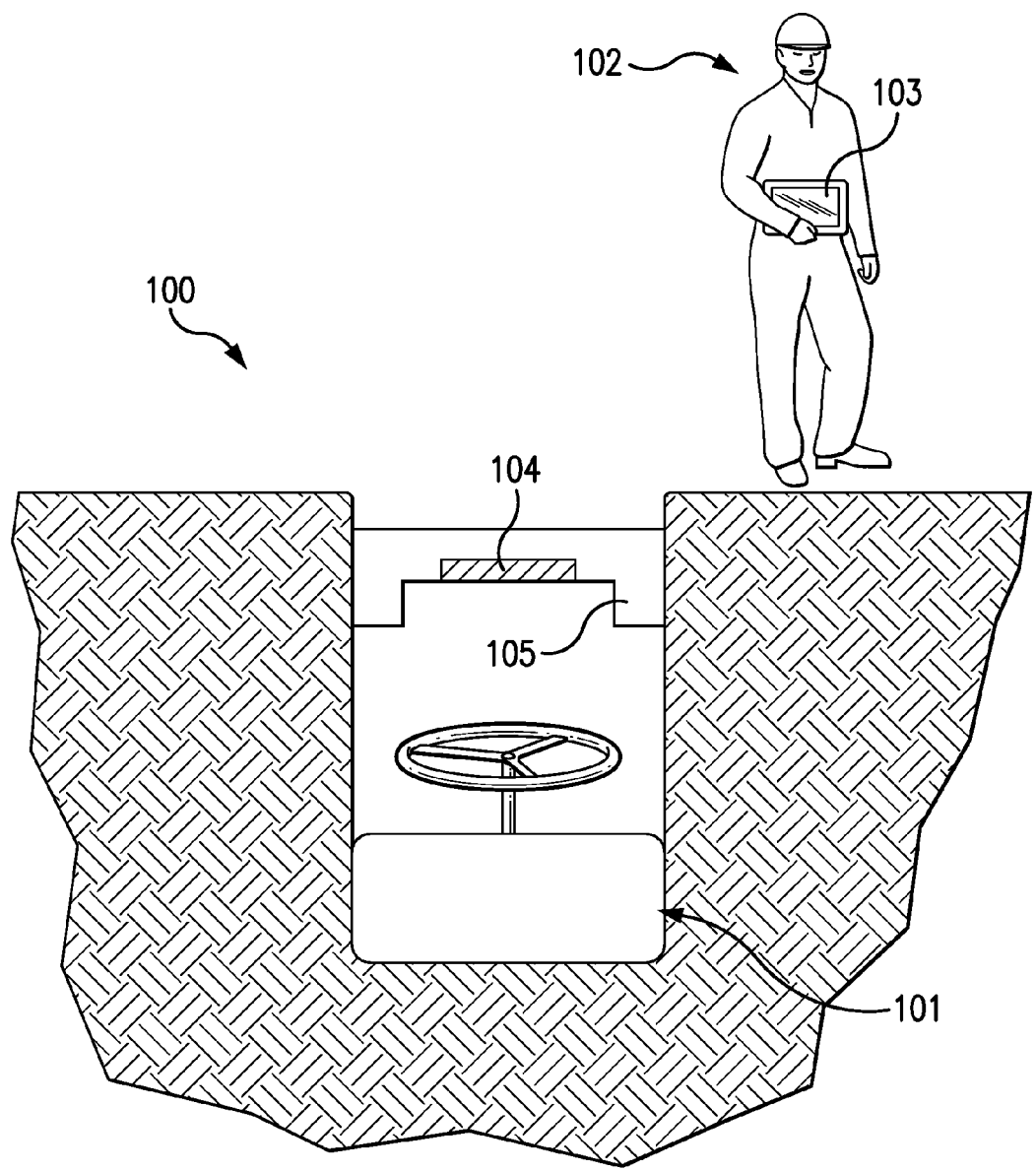
FIG. 1 is a schematic diagram of the preferred embodiment of the present invention.

An exemplary implementation of the AIRBAM system 100 is schematically illustrated in FIG. 1. The asset to be managed is an underground valve 101, which operates in an open or closed position by turning a valve knob or wheel. A field inspector 102 is equipped with a hand-held RFID transceiver 103, which communicates with an RFID transponder 104 located in a valve cover 105.

The valve cover 105 must be made of an RF-permeable material, preferably a durable polymer plastic. The RFID transponder/tag 104 can be removably attached to the plastic valve cover 105, or the tag 104 can be integrated with the cover 105 using an injection molding process. The RFID tag 104 is preferably a passive tag operating in the 902-928 MHz UHF band with a readable range of up to two meters.

The RFID tag 104 would store field data about the valve, its operation and its maintenance/inspection history. An exemplary field data list could include:
Valve identification number
GPS location
Depth below ground
Type and size of valve
Type of installation (e.g., vault, direct burial, etc.)
Horizontal or vertical orientation
Open/closed status
Mode of opening (direction and number of turns)
By-pass availability
Last inspection dates and results
Recent maintenance events
Next scheduled inspection/maintenance Alternately, some or all of the foregoing data, with the exception of the valve identification number, can be stored in a searchable database residing in the RFID transceiver 103. In this version, the RFID transceiver receives the valve identification number from the RFID transponder 104 and then retrieves the data associated with that valve identification number from its resident database.

Figure 2:
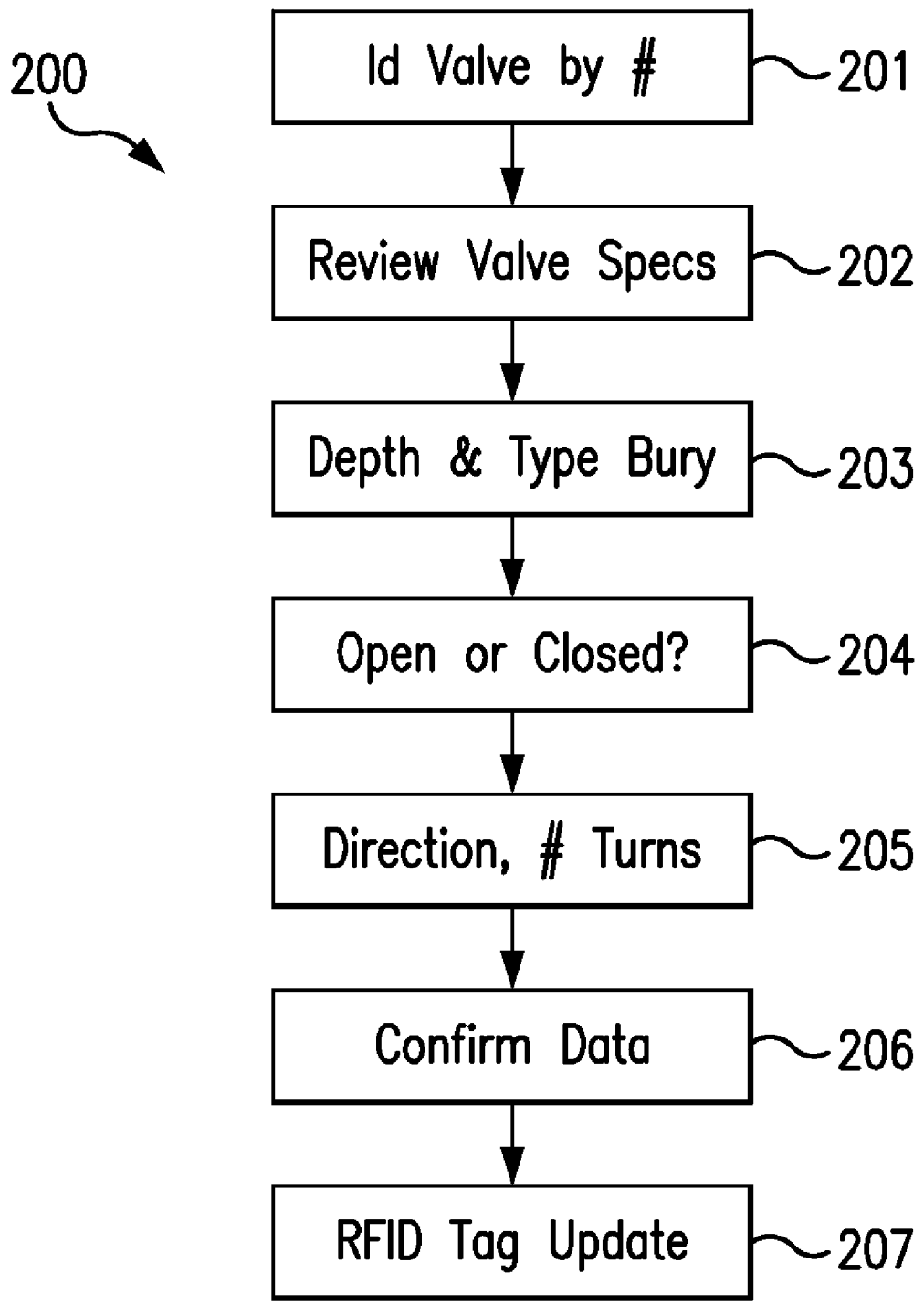
FIG. 2 is a flow chart depicting an exemplary underground valve inspection procedure conducted pursuant to the preferred embodiment of the present invention.

An illustrative inspection routine for the underground valve 101 using the AIRBAM system 200 is depicted in the flowchart of FIG. 2. Using the hand-held RFID transceiver 103, the field inspector 102 approaches the valve cover 105 within readable distance of the RFID transponder 104. Once communication with the tag 104 is established, the inspector 102 first checks the identification number 201 of the valve 101. Prior to accessing the valve 101, the inspection 102 familiarizes him/herself with the valve specifications 202 and the depth and type of underground installation 203. The inspector 102 also checks the status of valve 101 in the open or closed position 204 and determines the method of opening and closing it in terms of direction and number of turns 205.

The field inspector 102 would then be prepared to physically remove the valve cover 105 and perform a hands-on inspection to confirm and update the field data 206 stored on the RFID tag 104 and/or the resident database of the RFID reader 103. If appropriate, the inspector 102 updates the RFID tag data using the write function from the hand-held unit 103.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A method of acquiring and updating field data regarding equipment installed beneath or behind an access structure that is not proximate to the equipment, the method comprising:
    installing in or on the access structure one or more field-programmable RFID transponders having a readable range;
    storing one or more alpha-numeric identifiers associated with the equipment on the one or more field-programmable RFID transponders;
    storing some or all of the field data as resident field data, associated with the one or more alpha-numeric identifiers of the equipment, in one or more searchable databases residing on one or more portable RFID transceivers, wherein the field data includes some or all of the following information regarding the equipment: location, installation, size, structure, features, status, inspection and maintenance history, and scheduled inspection and maintenance events;
    storing the remainder of the field data, if any, as local field data on the one or more field-programmable RFID transponders;
    positioning the one or more portable RFID transceivers within the readable range of the one or more field-programmable RFID transponders;
    establishing radio frequency communication between the one or more portable RFID transceivers and the one or more field-programmable RFID transponders;
    reading with the one or more portable RFID transceivers the one or more alpha-numeric identifiers of the equipment and retrieving on the one or more portable RFID transceivers the associated resident field data from the one or more searchable databases prior to physically accessing the equipment;
    reading with the one or more portable RFID transceivers the local field data, if any, stored on the one or more field-programmable RFID transponders prior to physically accessing the equipment;
    physically removing the access structure and accessing the equipment;
    inspecting and, if necessary, performing maintenance on the equipment;
    writing with the one or more portable RFID transceivers updated field data to the one or more field-programmable RFID transponders for storage therein as the local field data; and
    storing the updated field data as the resident field data in the one or more searchable databases of the one or more portable RFID transceivers.

2. The method according to claim 1, wherein the one or more field-programmable RFID transponders are passive transponders.

3. The method according to claim 1, wherein the one or more field-programmable RFID transponders transmit in the radio frequency band of 902 to 928 MHz and the readable range is 1 to 2 meters.

* * * * *